US00RE48982E

(19) United States
(12) Reissued Patent
Yokota et al.

(10) Patent Number: US RE48,982 E
(45) Date of Reissued Patent: Mar. 22, 2022

(54) IMAGE FORMING APPARATUS WITH ROTARY ELEMENT OPPOSITE AN IMAGE READING UNIT

(71) Applicant: FUJIFILM Business Innovation Corp., Tokyo (JP)

(72) Inventors: Shusaku Yokota, Kanagawa (JP); Yoshinori Wada, Kanagawa (JP); Kazutoshi Shima, Kanagawa (JP)

(73) Assignee: FUJIFILM Business Innovation Corp., Tokyo (JP)

(21) Appl. No.: 16/718,987

(22) Filed: Dec. 18, 2019

Related U.S. Patent Documents

Reissue of:
(64) Patent No.: 9,733,615
Issued: Aug. 15, 2017
Appl. No.: 15/132,719
Filed: Apr. 19, 2016

(30) Foreign Application Priority Data

Nov. 17, 2015 (JP) ..... 2015-224371

(51) Int. Cl.
*G03G 21/20* (2006.01)
*G03G 15/00* (2006.01)

(52) U.S. Cl.
CPC ..... *G03G 21/206* (2013.01); *G03G 15/5058* (2013.01); *G03G 15/5062* (2013.01); *G03G 2215/0129* (2013.01); *G03G 2215/0164* (2013.01)

(58) Field of Classification Search
CPC ..... G03G 15/5058; G03G 21/206; G03G 15/5062; G03G 2215/0164; G03G 2215/0129
See application file for complete search history.

(56) References Cited

U.S. PATENT DOCUMENTS

2012/0020713 A1 1/2012 Ishii et al.
2012/0097872 A1* 4/2012 Ito ..... G03G 15/0189 250/559.4
2012/0099873 A1* 4/2012 Ninomiya ..... G03G 15/5041 399/15

(Continued)

FOREIGN PATENT DOCUMENTS

JP 6-227700 A 8/1994
JP 9305695 A 11/1997

(Continued)

OTHER PUBLICATIONS

Communication dated Feb. 4, 2020, from the Japanese Patent Office in application No. 2015-224371.

(Continued)

*Primary Examiner* — William C Doerrler
(74) *Attorney, Agent, or Firm* — Sughrue Mion, PLLC

(57) ABSTRACT

An image forming apparatus includes a sheet transport path that transports a sheet on which an image has been recorded, the sheet transport path including a first guide surface and a second guide surface opposed to the first guide surface, an image reading unit disposed on the same side as the first guide surface of the sheet transport path to read the image, and a rotary element disposed on the same side as the second guide surface, the rotary element being rotatably disposed with a gap between the rotary element and the first guide surface.

15 Claims, 9 Drawing Sheets

(56) References Cited

U.S. PATENT DOCUMENTS

| | | | | |
|---|---|---|---|---|
| 2014/0086615 | A1* | 3/2014 | Yasuda | G03G 15/2017 399/94 |
| 2014/0185047 | A1* | 7/2014 | Tajima | G01J 3/46 356/402 |
| 2014/0313256 | A1 | 10/2014 | Donaldson et al. | |
| 2014/0376932 | A1* | 12/2014 | Koyama | G03G 15/5062 399/15 |

FOREIGN PATENT DOCUMENTS

| | | | |
|---|---|---|---|
| JP | 2000-264452 | A | 9/2000 |
| JP | 2005-321569 | A | 11/2005 |
| JP | 2006011204 | A | 1/2006 |
| JP | 2006-84579 | A | 3/2006 |
| JP | 2006335501 | A | 12/2006 |
| JP | 2007-279165 | A | 10/2007 |
| JP | 2008-225354 | A | 9/2008 |
| JP | 2009-204963 | A | 9/2009 |
| JP | 2010014986 | A | 1/2010 |
| JP | 2012-27133 | A | 2/2012 |
| JP | 2012027133 | A | 2/2012 |
| JP | 2012065161 | A | 3/2012 |
| JP | 2012093393 | A | 5/2012 |
| JP | 2012-128201 | A | 7/2012 |
| JP | 2013091536 | A | 5/2013 |
| JP | 2013174801 | A | 9/2013 |
| KR | 1020060078531 | A | 7/2006 |

OTHER PUBLICATIONS

Office Action dated Feb. 24, 2021 in Japanese Application No. 2020-065538.

Office Action dated Feb. 24, 2021 in Japanese Application No. 2020-065537.

Office Action dated Aug. 17, 2021 from the Japanese Patent Office in Application No. 2020-065538.

Office Action dated Aug. 17, 2021 from the Japanese Patent Office in Application No. 2020-065537.

Communication dated Jan. 25, 2022, issued by the Japanese Patent Office in counterpart Japanese Application No. 2020-065537.

Communication dated Jan. 25, 2022, issued by the Japanese Patent Office in counterpart Japanese Application No. 2020-065538.

* cited by examiner

IMAGE FORMING APPARATUS WITH ROTARY ELEMENT OPPOSITE AN IMAGE READING UNIT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This is a reissue application of U.S. Pat. No. 9,733,615, which was filed as U.S. patent application Ser. No. 15/132,719 on Apr. 19, 2016 and issued on Aug. 14, 2017, which claims priority to Japanese Patent Application No. 2015-224371 filed Nov. 17, 2015, the disclosures of which are incorporated herein by reference in their entireties.*

CROSS-REFERENCE TO RELATED APPLICATIONS

This application is based on and claims priority under 35 USC 119 from Japanese Patent Application No. 2015-224371 filed Nov. 17, 2015.

BACKGROUND

Technical Field

The present invention relates to an image forming apparatus.

SUMMARY

According to an aspect of the invention, there is provided an image forming apparatus including a sheet transport path that transports a sheet on which an image has been recorded, the sheet transport path including a first guide surface and a second guide surface opposed to the first guide surface, an image reading unit disposed on the same side as the first guide surface of the sheet transport path to read the image, and a rotary element disposed on the same side as the second guide surface, the rotary element being rotatably disposed with a gap between the rotary element and the first guide surface.

BRIEF DESCRIPTION OF THE DRAWING

Exemplary embodiments of the present invention will be described in detail based on the following figures, wherein.

DETAILED DESCRIPTION

Next, the present invention will be described in further detail with reference to the figures by way of its exemplary embodiments and specific examples. However, the present invention is not limited to the exemplary embodiments and specific examples.

It is to be noted that in the following description made with reference to the figures, the figures are for illustrative purposes only, and details such as the relative ratios of various dimensions may differ from the actuality. For the ease of understanding, components other than those required for explanation are not illustrated as appropriate.

Figure 1:
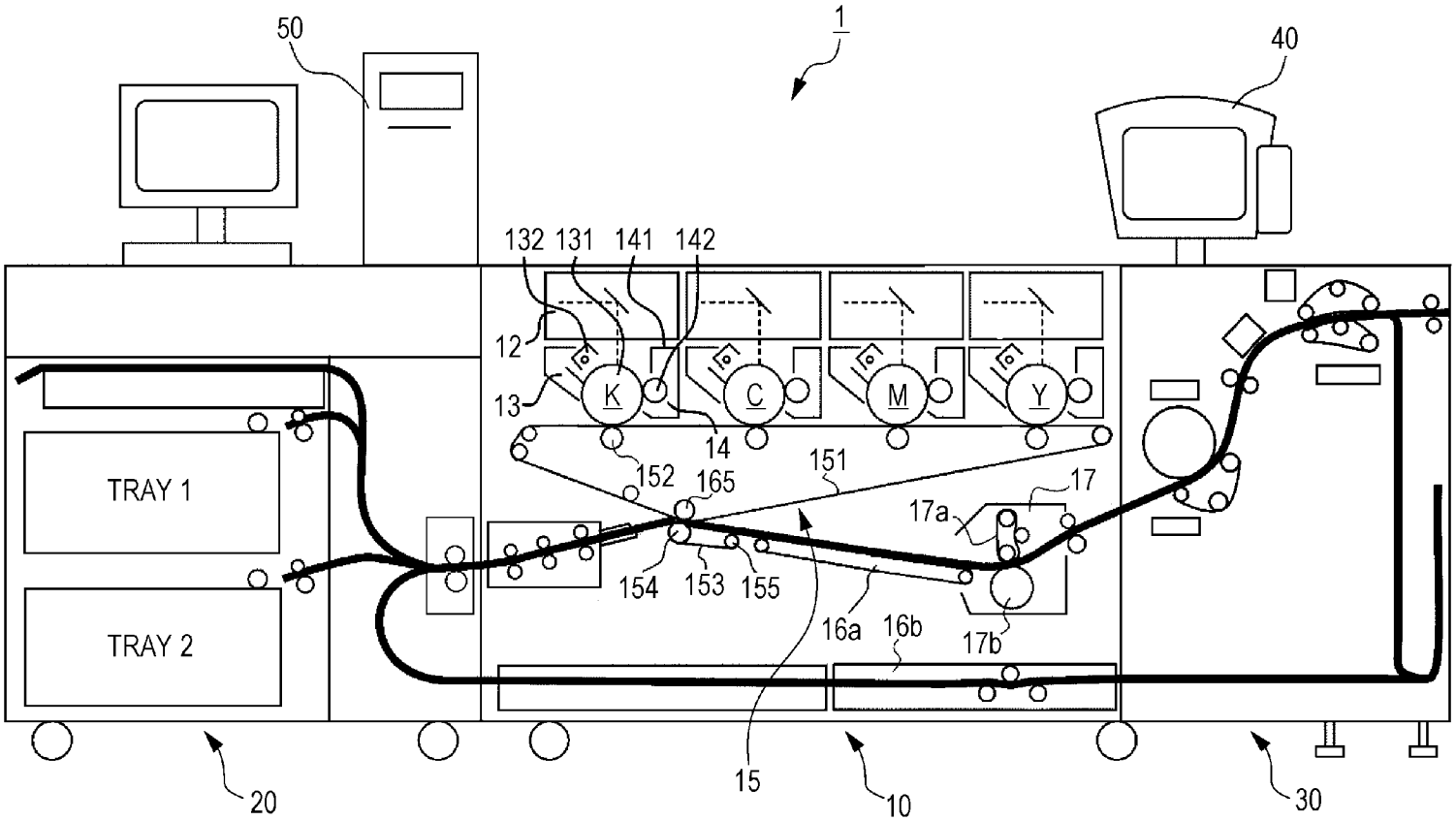
FIG. 1 is a schematic cross-sectional view illustrating the general internal configuration of an image forming apparatus.

First Exemplary Embodiment (1) Overall Configuration and Operation of Image Forming Apparatus (1.1) Overall Configuration of Image Forming Apparatus FIG. 1 is a schematic cross-sectional view illustrating the general configuration of an image forming apparatus 1 according to a first exemplary embodiment. The image forming apparatus 1 includes an image forming part 10, a paper feed device 20 attached to one end of the image forming part 10, a sheet discharge device 30 disposed at the other end of the image forming part 10 to discharge a sheet that has been printed, an operational information part 40, and an image processing part 50 that generates image information from print information transmitted from a host apparatus.

The image forming part 10 includes a system controller (not illustrated), exposure devices 12, photoconductor units 13, developing devices 14, a transfer device 15, sheet transport devices 16a and 16b, a fixing device 17, and an image reading device. The image forming part 10 receives image information from the image processing part 50, and based on the image information, the image forming part 10 forms a toner image on a sheet of paper fed from the paper feed device 20.

The paper feed device 20 includes multiple paper loading parts (Tray1 and Tray2) to receive sheets that differ in type (for example, material, thickness, paper size, and paper grain). The paper feed device 20 supplies a sheet sent out from one of the multiple paper loading parts to the image forming part 10.

The sheet discharge device 30 discharges a sheet on which an image has been formed in the image forming part 10. An image reading part 330 is disposed further downstream of the fixing device 17 in the sheet transport direction. The image reading part 330 has the function of reading image information recorded on a side of the sheet discharged and transported from the fixing device 17 on which a toner image has been formed.

The operational information part 40 is used to make various settings, input instructions, and display information.

That is, the operational information part 40 corresponds to a so-called user interface. Specifically, the operational information part 40 is made up of a combination of a liquid crystal display panel, various operating buttons, a touch panel, and other components.

(1.2) Configuration and Operation of Image Forming Unit

In the image forming apparatus 1 described above, a sheet sent out from a paper loading part of the paper feed device 20 that is specified by a print job for each single sheet to be printed, is fed to the image forming part 10 in synchronism with the timing of image formation.

The photoconductor units 13 are disposed in parallel below the corresponding exposure devices 12. Each of the photoconductor units 13 includes a photoconductor drum 131 that is rotationally driven. A charger 132, the exposure device 12, the developing device 14, a first transfer roller 152, and a cleaning blade are disposed in the direction of rotation of the photoconductor drum 131.

The developing device 14 has a developing housing 141 in which a developer is received. A developing roller 142, which is opposed to the photoconductor drum 131, is disposed inside the developing housing 141. A layer regulating member (not illustrated) that regulates the layer thickness of developer is disposed in close proximity to the developing roller 142.

Each of the developing devices 14 is of substantially the same configuration except for the developer received in the corresponding developing housing 141. Each of the developing devices 14 forms a toner image of yellow (Y), magenta (M), cyan (C), or black (K).

As the photoconductor drum 131 rotates, its surface is charged by the charger 132, and an electrostatic latent image is formed on the surface of the photoconductor drum 131 by latent image-forming light emitted from the exposure device 12. The electrostatic latent image formed on the photoconductor drum 131 is developed as a toner image by the developing roller 142.

The transfer device 15 includes an intermediate transfer belt 151, the first transfer roller 152, and a second transfer belt 153. The intermediate transfer belt 151 is a first endless belt to which toner images of various colors formed on the photoconductor drums 131 of the photoconductor units 13 are transferred in a superimposed manner. The first transfer roller 152 sequentially transfers toner images of various colors formed in the photoconductor units 13 to the intermediate transfer belt 151 (first transfer). The second transfer belt 153 is a second endless belt that transfers toner images of various colors transferred onto the intermediate transfer belt 151 in a superimposed manner, to a sheet that is a recording medium at once (second transfer).

The second transfer belt 153 is stretched under tension between a second transfer roller 154 and a stripping roller 155. The second transfer belt 153 is sandwiched between a backup roller 165 disposed on the back side of the intermediate transfer belt 151, and the second transfer roller 154, forming a second transfer part (TR).

Toner images of various colors formed on the photoconductor drums 131 of the photoconductor units 13 are sequentially electrostatically transferred (first transfer) onto the intermediate transfer belt 151 by the first transfer roller 152 that is being applied with a predetermined transfer voltage from a power supply device (not illustrated) controlled by the system controller. This first transfer forms superimposed toner images with various colors of toner superimposed on each other.

As the intermediate transfer belt 151 circulates, the superimposed toner images on the intermediate transfer belt 151 are transported to the second transfer part TR where the second transfer belt 153 is disposed. Once the superimposed toner images are transported to the second transfer part TR, a sheet is supplied to the second transfer part TR from the paper feed device 20 in synchronism with this timing. Then, a predetermined transfer voltage is applied to the backup roller 165, which is opposed to the second transfer roller 154 with the second transfer belt 153 therebetween, from the power supply device or other devices controlled by the system controller. This causes the superimposed toner images on the intermediate transfer belt 151 to be transferred to the sheet at once.

Residual toner on the surface of the photoconductor drum 131 is removed by the cleaning blade, and collected in a waste-toner receiving part (not illustrated). The surface of the photoconductor drum 131 is charged by the charger 132 again.

The fixing device 17 includes a fixing belt 17a in an endless form that rotates in one direction, and a pressure roller 17b that contacts the peripheral surface of the fixing belt 17a and rotates in one direction. The press contact region between the fixing belt 17a and the pressure roller 17b forms a nip part (fixing region).

After a toner image is transferred to the sheet in the transfer device 15, the sheet is transported to the fixing device 17 via the sheet transport device 16a. In this state, the toner image has not been fixed onto the sheet yet. The toner image is then fixed onto the sheet transported to the fixing device 17 with pressure and heat applied by the pair of the fixing belt 17a and the pressure roller 17b.

The sheet with the fixed toner image is fed to the sheet discharge device 30. When an image is to be formed on both sides of the sheet, the front and back sides of the sheet are reversed by the sheet transport device 16b, and then the sheet is fed to the second transfer part TR of the image forming part 10 again. Then, after a toner image is transferred and the transferred image is fixed onto the sheet, the sheet is fed to the sheet discharge device 30. The sheet fed to the sheet discharge device 30 is cooled in a cooling part 320. Then, after the image on the sheet is read by the image reading part 330 as necessary, the sheet is discharged to a discharged-sheet receiving part (not illustrated).

(2) Configuration and Operation of Sheet Discharge Device

Figure 2:
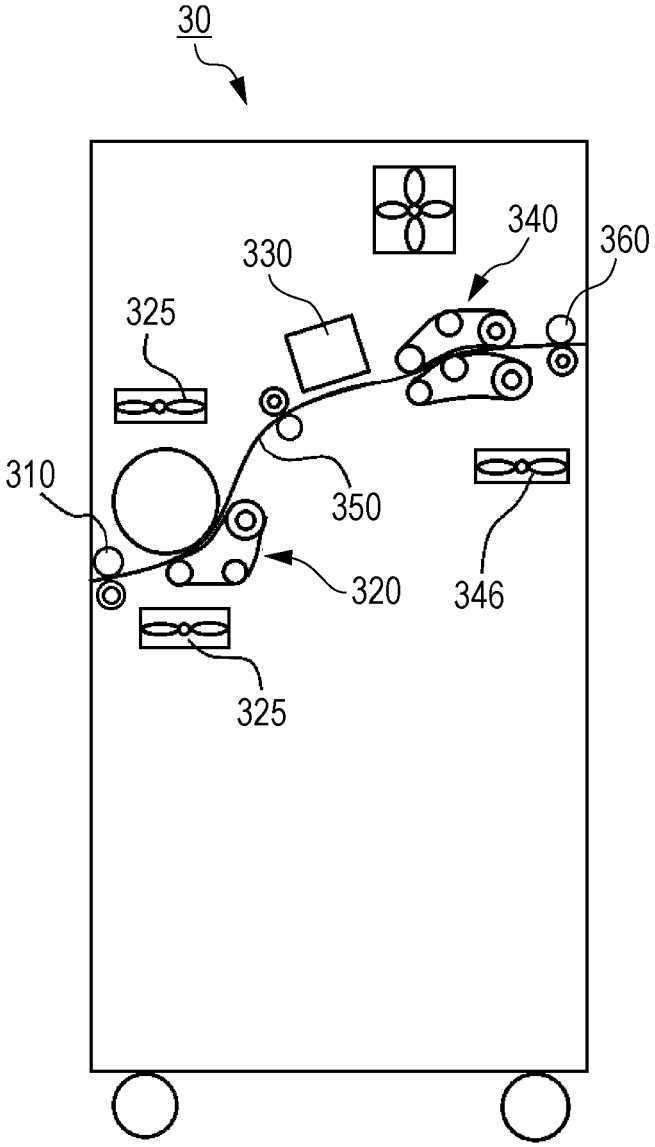
FIG. 2 is a schematic cross-sectional view illustrating the general internal configuration of a sheet discharge device.
Figure 3:
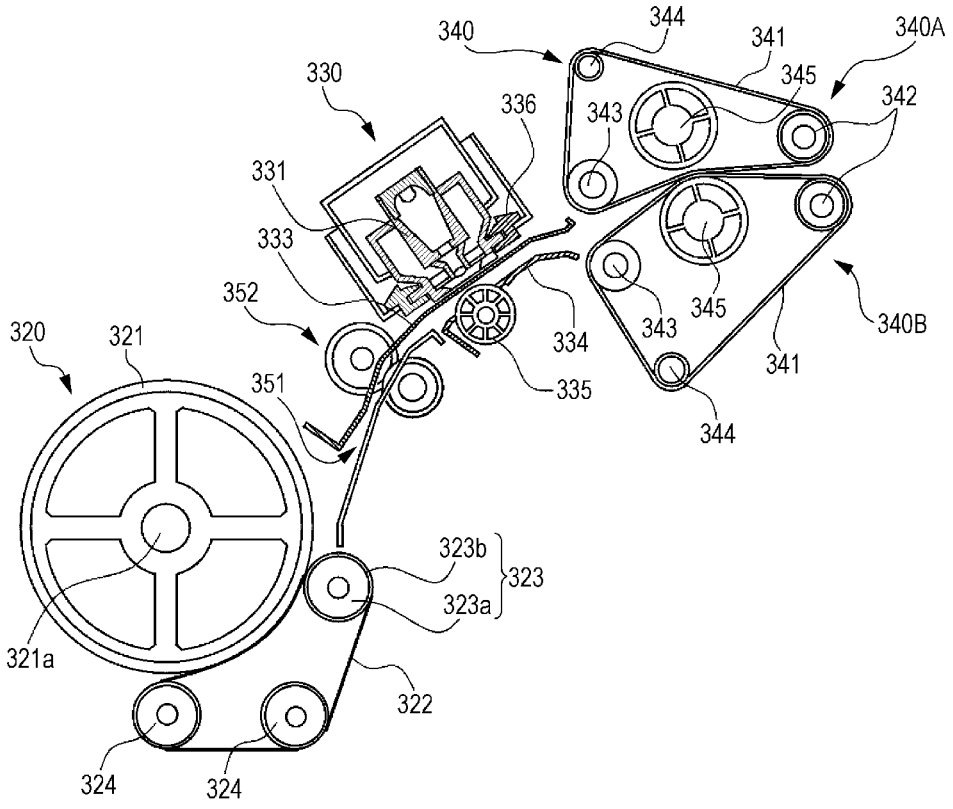
FIG. 3 is a schematic cross-sectional view of the major components of a sheet discharge device.
Figure 4A:
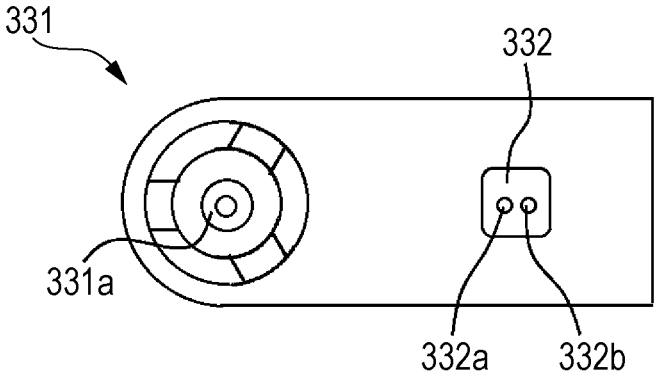
FIGS. 4A and 4B are respectively a bottom view and a schematic cross-sectional view of the imaging side of an imaging part.
Figure 4B:
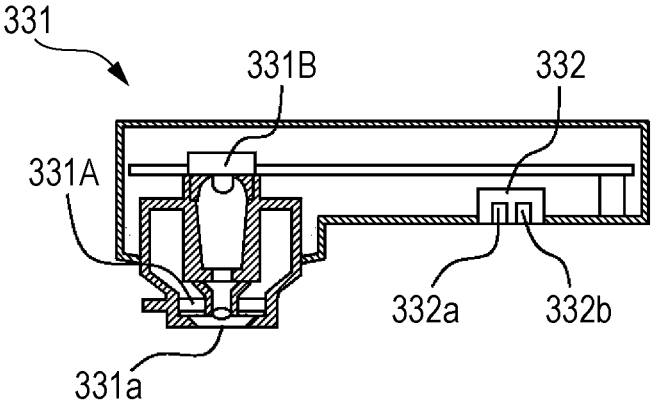
Figure 5B:
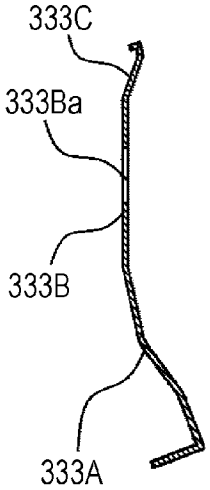
FIGS. 5A and 5B are respectively a schematic plan view and a side view of an upper guide plate including an imaging part.
Figure 5A:
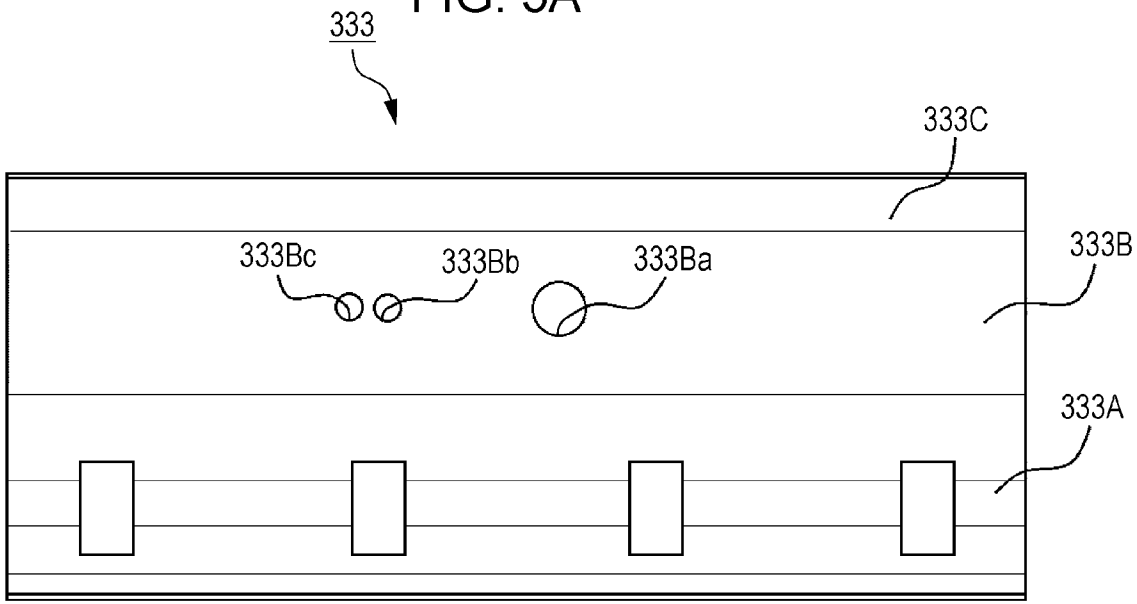
Figure 6B:
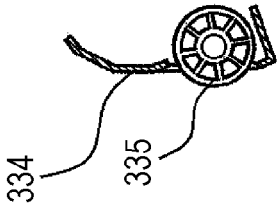
FIGS. 6A and 6B are respectively a schematic plan view and a side view of a lower guide plate including an opposed roller.
Figure 6A:
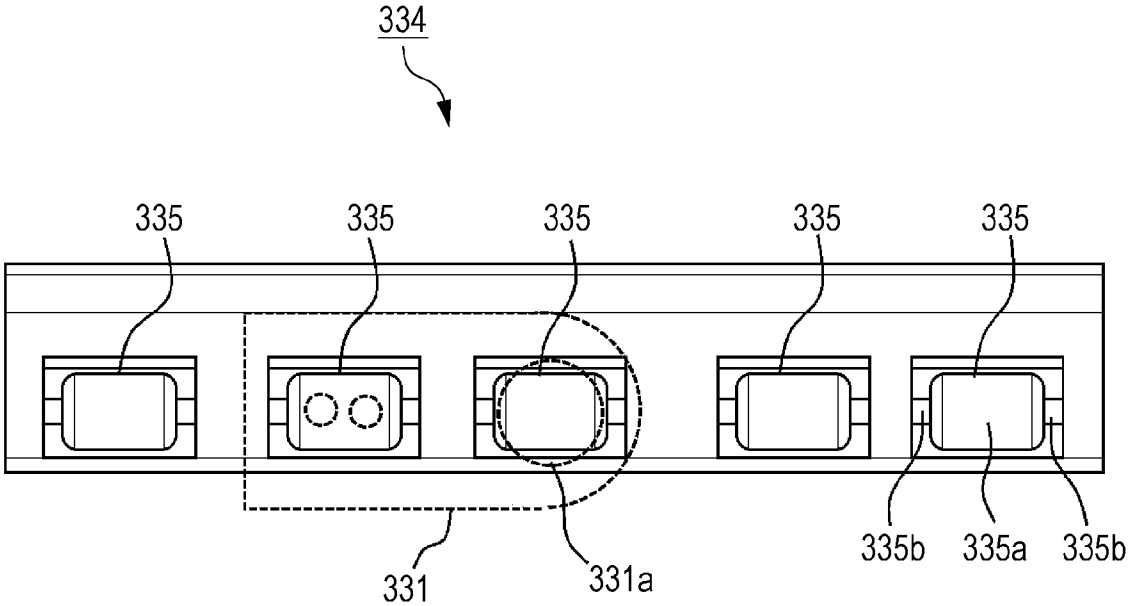
Figure 9A:
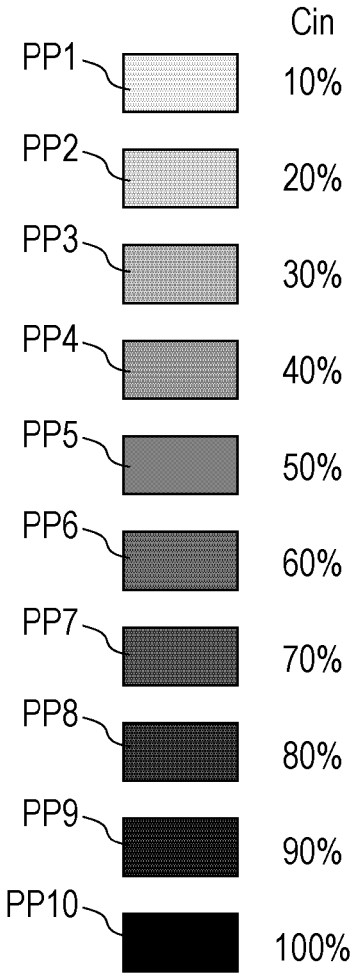
FIGS. 9A and 9B are plan views respectively illustrating an example of patch patterns used for tone correction, and an example of a ladder pattern of a test image.
Figure 9B:
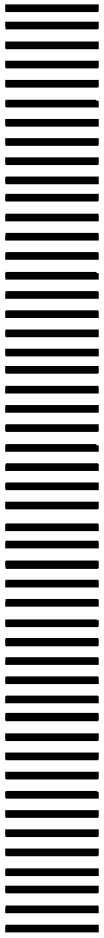

FIG. 2 is a schematic cross-sectional view illustrating the general internal configuration of the sheet discharge device 30. FIG. 3 is a schematic cross-sectional view of the major components of the sheet discharge device 30. FIGS. 4A and 4B are respectively a bottom view and a schematic cross-sectional view of the imaging side of an imaging part 331. FIGS. 5A and 5B are respectively a schematic plan view and a side view of an upper guide plate 333 including the imaging part 331. FIGS. 6A and 6B are respectively a schematic plan view and a side view of a lower guide plate 334 including an opposed roller 335. FIGS. 9A and 9B are plan views respectively illustrating an example of patch patterns PP used for tone correction, and an example of a ladder pattern of a test image.

Hereinafter, the configuration and operation of the sheet discharge device 30 will be described with reference to the figures.

(2.1) Configuration of Sheet Discharge Device

As illustrated in FIG. 2, the sheet discharge device 30 includes a pair of receiving rollers 310, the cooling part 320, which is an example of a cooling unit, the image reading part 330, a sheet bending part 340, which is an example of a bending unit, a sheet transport part 350, and a pair of discharge rollers 360.

The sheet that has undergone fixing of a toner image and heating in the fixing device 17 is taken into the sheet discharge device 30 by the pair of receiving rollers 310. As the sheet passes through the cooling part 320 along the side on which a curl has formed, heat is dissipated from the sheet. Then, the image reading part 330 optically reads an image formed on the sheet cooled in the cooling part 320, and generates image data. Thereafter, the sheet has its curl straightened out in the sheet bending part 340 before being discharged to the discharged-sheet receiving part (not illustrated) via the pair of discharge rollers 360.

As illustrated in FIG. 3, the cooling part 320 includes a cooling drum 321, a transport belt 322, and a blower fan 325 (see FIG. 2). The cooling drum 321, which is an example of a heat dissipation element, comes into contact with one side of the sheet. The transport belt 322 is stretched under tension so as to sandwich the sheet between the transport belt 322 and the cooling drum 321. The blower fan 325, which is an example of an air blower, blows a stream of air onto the cooling drum 321 and the transport belt 322.

The cooling drum 321 is a cylindrical body entirely made of a metallic material with high thermal conductivity, such as aluminum. In the first exemplary embodiment, the cooling drum 321 is an aluminum pipe with a diameter of 200 mm. Support shafts 321a projecting from both ends of the cooling drum 321 are rotatably supported on a housing (not illustrated) of the sheet discharge device 30 via a bearing (not illustrated).

The transport belt 322 is, for example, an endless belt fabricated using a synthetic resin material such as polyimide. The transport belt 322 is supported by a driving roller 323 and multiple support rollers 324 so as to circulate while being stretched under a predetermined tension. The driving roller 323 includes a base 323a in a cylindrical or circular cylindrical form made of a rigid material such as synthetic resin or metal, and a covering layer (surface layer) 323b made of urethane resin or other materials coated on the peripheral surface of the base 323a for increased friction with the inner peripheral surface of the transport belt 322.

The blower fan 325 is rotationally driven during operation of the cooling part 320 to blow a stream of air onto the surfaces of the cooling drum 321 and the transport belt 322, thus cooling the cooling drum 321 and the transport belt 322.

The sheet transport part 350 includes a transport path 351 that guides the sheet having passed through the cooling part 320 to the image reading part 330, and a pair of transport rollers 352 that transports the sheet to the image reading part 330.

The image reading part 330 includes the imaging part 331, a photosensor 332, the upper guide plate 333, and the lower guide plate 334. The imaging part 331, which is an example of an image reading unit, is disposed opposite to a side of the transported sheet on which an image has been formed, and reads the image on the sheet. The photosensor 332, which is an example of a detector, detects a test image. The upper guide plate 333 forms a first guide surface that guides the sheet during transport of the sheet. The lower guide plate 334, which is an example of a second guide surface, is disposed opposite to the upper guide plate 333.

As illustrated in FIGS. 4A and 4B, the imaging part 331 is an in-line sensor (ILS) that optically detects an image fixed on the sheet, and multiple patch patterns PP (PP1, PP2, PP3, PP4, PP5, PP6, PP7, PP8, PP9, PP10: see FIG. 9A) used for tone correction and for in-plane color unevenness correction. The imaging part 331 is secured onto the inner side of the upper guide plate 333 by a holding member 336 such that the imaging part 331 is opposed to a surface of the transported sheet on which an image has been formed.

The imaging part 331 includes an irradiation part 331A, and a charge coupled device (CCD) sensor 331B. The irradiation part 331A, which includes, for example, a linear tungsten lamp (not illustrated), is positioned opposite to a surface of the sheet on which an image has been formed. The CCD sensor 331B receives light radiated from the irradiation part 331A and reflected by the sheet.

The imaging part 331 described above captures an image formed on the sheet being transported, and creates a spectrum in the wavelength range of, for example, 400 nm to 700 nm to take a color measurement of a target area on the sheet. The resulting optical signal detected by the imaging part 331 is converted into an electrical signal. The electrical signal is then transmitted to the system controller and used as data for tone correction and color unevenness correction.

The photosensor 332 has a light-emitting part 332a that emits light, and a light-receiving part 332b capable of receiving light emitted from the light-emitting part 332a. The photosensor 332 optically reads a ladder pattern (see FIG. 9B) formed as a test image. The read signal is transmitted to the system controller, and used as, for example, data for controlling the transport speed of the sheet.

As illustrated in FIGS. 5A and 5B, the upper guide plate 333 is a plate-like member made of metal. The upper guide plate 333 includes a first guide part 333A, a second guide part 333B, and a third guide part 333C. The first guide part 333A guides the sheet toward the imaging part 331. The second guide part 333B guides the sheet, which is transported below the imaging part 331, along a light guide part 331a of the imaging part 331. The third guide part 333C guides the sheet from which an image has been read in the imaging part 331, to the sheet bending part 340.

The second guide part 333B includes an opening 333Ba, an opening 333Bb, and an opening 333Bc. The opening 333Ba allows light radiated from the imaging part 331 to pass through the opening 333Ba, and guides light that is reflected in the direction of the optical axis by the image surface. The opening 333Bb allows light emitted from the light-emitting part 332a of the photosensor 332 to pass through the 333Bb. The opening 333Bc guides reflected light received by the light-receiving part 332b.

As illustrated in FIGS. 6A and 6B, the opposed roller 335, which is an example of a rotary element, is disposed on the lower guide plate 334 so as to be opposed to the light guide part 331a of the imaging part 331, with the surface of the opposed roller 335 projecting from the lower guide plate 334. The opposed roller 335 is disposed at a position opposite to the light guide part 331a of the imaging part 331 and at a position opposite to the photosensor 332, and is also disposed outside the area of the imaging part 331 in a direction that crosses (orthogonal to) the direction of transport of the sheet.

The opposed roller 335 is made of synthetic resin such as polyacetal (POM). The opposed roller 335 is an integral assembly of a main body part 335a in a cylindrical form, and a shaft part 335b extending from each end of the main body part 335a. The shaft part 335b is replaceably attached to the lower guide plate 334.

The opposed roller 335 has a surface color that is selected in accordance with a predetermined trigger image in a test image. Specifically, if the trigger image is the background portion (white) of a ladder pattern formed as a test image, black is selected as the surface color of the opposed roller 335, and if the trigger image is the image portion (black) of the ladder pattern, then white is selected as the surface color of the opposed roller 335.

The sheet bending part 340 is made up of a pair of decurling members including an upper decurling member 340A and a lower decurling member 340B that are opposed to each other so as to sandwich the transported sheet therebetween. The pair of decurling members including the upper decurling member 340A and the lower decurling member 340B includes a transport belt 341, which is supported by a driving roller 342 and multiple support rollers 343 and 344 so as to circulate while being stretched under a predetermined tension, and a pair of straightening rollers 345 that press the transport belt 341 from the inner side of the transport belt 341.

In the first exemplary embodiment, the straightening roller 345 of the lower decurling member 340B is in contact with one side of the transport belt 341 of the upper decurling member 340A with the transport belt 341 of the lower decurling member 340B therebetween. The straightening roller 345 of the lower decurling member 340B bends the one side of the transport belt 341 of the upper decurling member 340A upward to straighten out an upper curl of the transported sheet that has been set in the cooling part 320.

A stream of air is blown from a blower fan 346 (see FIG. 2) onto the transport belt 341 of the lower decurling member 340B. This allows heat to be dissipated from the sheet through the transport belt 341 of the lower decurling member 340B, thus securely fixing the straightened position imparted to the sheet. The sheet with its upper curl thus straightened out is discharged to the discharged-sheet receiving part (not illustrated) from the pair of discharge rollers 360.

(2.2) Operation of Sheet Discharge Device

In the sheet discharge device 30 described above, after a toner image is fixed onto the sheet in the fixing device 17, the sheet is bent (curled) in the same direction as the side of the sheet on which the image to be read by the image reading part 330 is recorded, and then the sheet is transported to the cooling part 320 in that state.

In the cooling part 320, the sheet becomes sandwiched between the cooling drum 321 and the transport belt 322, and as the sheet is transported along the surface of the cooling drum 321, the sheet has its heat removed by the cooling drum 321, causing the sheet to cool.

The sheet cooled in the cooling part 320 is guided to the image reading part 330 via the sheet transport part 350. As the sheet passes through the gap defined between the second guide part 333B of the upper guide plate 333 where the imaging part 331 and the photosensor 332 are disposed, and the opposed roller 335 disposed so as to project from the lower guide plate 334 toward the second guide part 333B, an image recorded on the surface of the sheet is read.

In the image reading part 330, the sheet, which has been cooled to a lower temperature in the cooling part 320, is transported so as to pass through the gap defined between the upper guide plate 333 and the opposed roller 335 with flopping of the sheet reduced, thus allowing for accurate reading of the image recorded on the sheet.

The sheet with the image read in the image reading part 330 is guided from the third guide part 333C to the sheet bending part 340.

In the sheet bending part 340, the straightening roller 345 of the lower decurling member 340B, which is in contact with one side of the transport belt 341 of the upper decurling member 340A with the transport belt 341 of the lower decurling member 340B therebetween, bends the one side of the transport belt 341 of the upper decurling member 340A upward to straighten out an upper curl of the transported sheet that has been set in the cooling part 320. The sheet with its upper curl straightened out is discharged to the discharged-sheet receiving part (not illustrated) from the pair of discharge rollers 360.

Second Exemplary Embodiment

Figure 7:
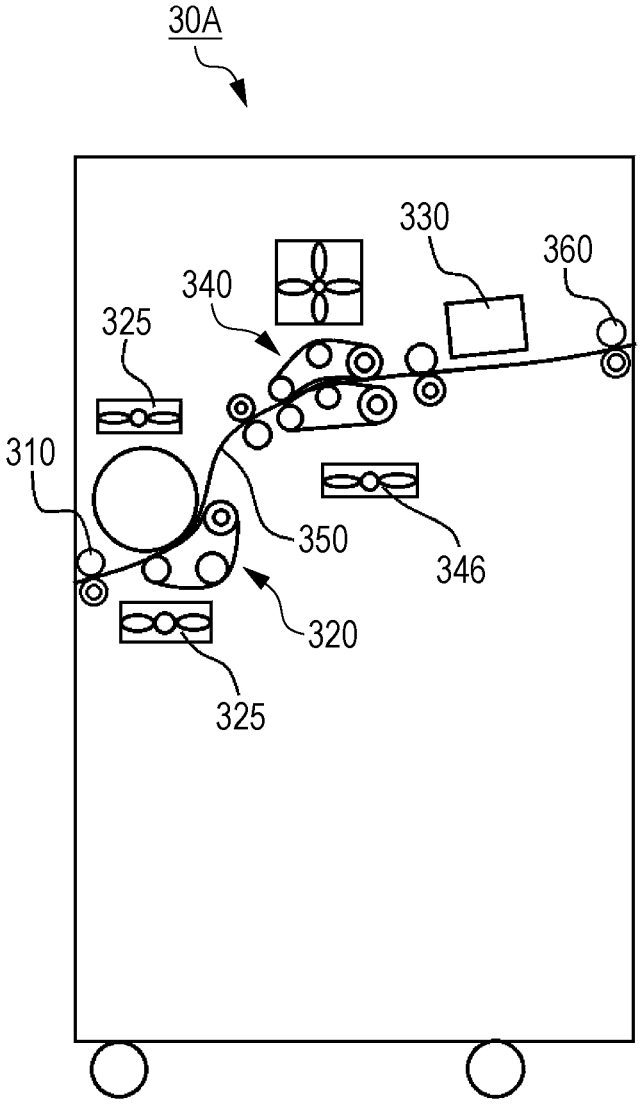
FIG. 7 is a schematic cross-sectional view illustrating the general internal configuration of a sheet discharge device.
Figure 8:
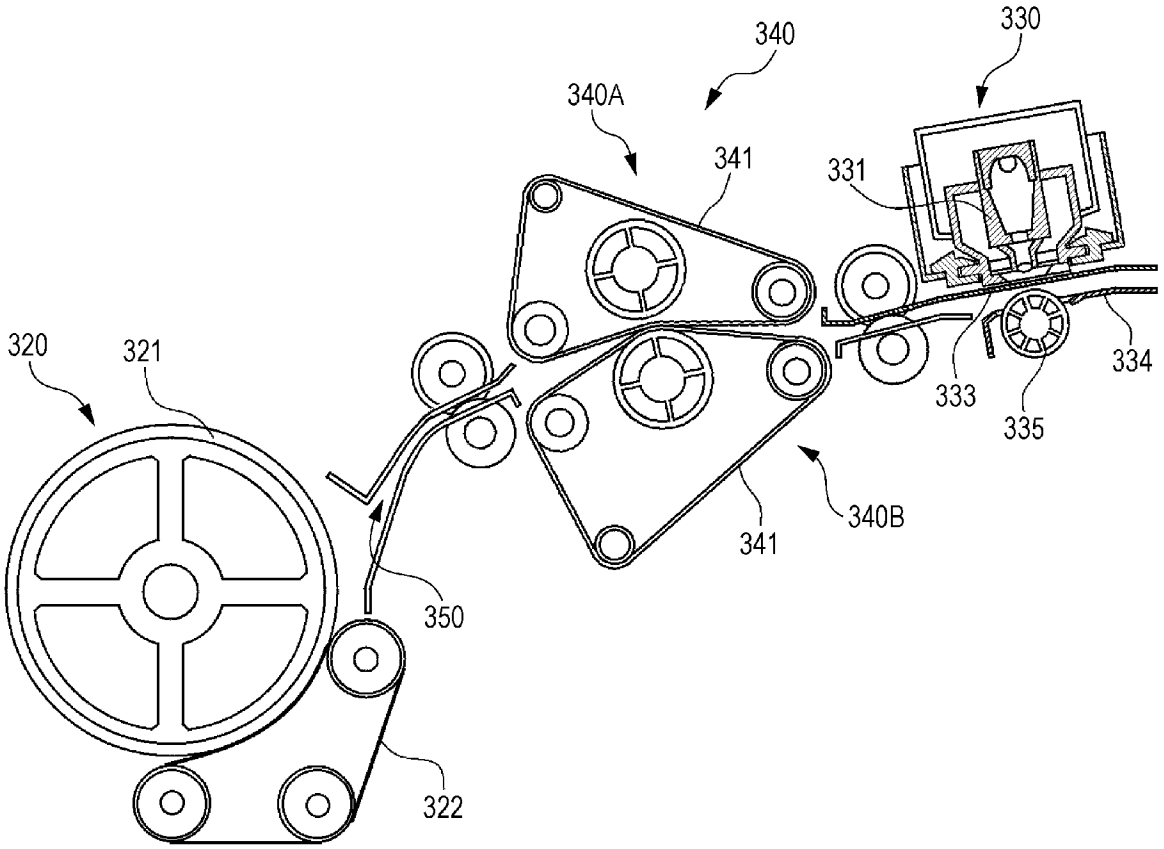
FIG. 8 is a schematic cross-sectional view of a cooling part, a sheet transport part, a sheet bending part, and an image reading part.

FIG. 7 is a schematic cross-sectional view illustrating the general internal configuration of a sheet discharge device 30A. FIG. 8 is a schematic cross-sectional view of the cooling part 320, the sheet transport part 350, the sheet bending part 340, and the image reading part 330.

Hereinafter, the configuration and operation of the sheet discharge device 30A will be described with reference to the figures. The sheet discharge device 30A differs from the sheet discharge device 30 according to the first exemplary embodiment in that the image reading part 330 is disposed downstream of the sheet bending part 340 in the sheet transport direction. Accordingly, components that are the same as those of the sheet discharge device 30 according to the first embodiment will be denoted by the same reference signs, and a detailed description will not be given of those components.

As illustrated in FIG. 7, the sheet discharge device 30A includes the pair of receiving rollers 310, the cooling part 320, which an example of a cooling unit, the sheet bending part 340, which is an example of a bending unit, the image reading part 330, which is an example of an image reading unit, the sheet transport part 350, and the pair of discharge rollers 360.

As illustrated in FIG. 8, the sheet is taken into the sheet discharge device 30A by the pair of receiving rollers 310, and as the sheet passes through the cooling part 320 along the side on which a curl has formed, heat is dissipated from the sheet. The sheet is then transported to the sheet bending part 340 via the sheet transport part 350, and has its curl straightened out in the sheet bending part 340.

Then, the image reading part 330 optically reads an image formed on the sheet that has been cooled in the cooling part 320 and has its curl straightened out in the cooling part 320, thus generating image data. Thereafter, the sheet is discharged to the discharged-sheet receiving part (not illustrated) via the pair of discharge rollers 360.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

a sheet transport path configured to transport a sheet on which an image has been recorded, the sheet transport path including a first guide surface and a second guide surface opposed to the first guide surface;

an image reading unit disposed on a same side as the first guide surface of the sheet transport path and configured to read the image, *the image reading unit includes a light-emitting part to emit light*; and a cylindrical rotary element disposed on a same side as the second guide surface, the *cylindrical* rotary element being rotatably disposed with [a] *an air* gap between the cylindrical rotary element and the first guide surface, *along a full length of the cylindrical rotary element, when the image reading unit reads the image,*

*wherein the first guide surface includes a light passing part configured to allow light emitted from the light-emitting part pass through,*

*wherein the cylindrical rotary element is disposed overlapping the light passing part in a direction of transport of the sheet in the sheet transport path, and*

*wherein the cylindrical rotary element is disposed in an area opposite to the image reading unit in a direction perpendicular to a surface of the transported sheet.*

[2. The image forming apparatus according to claim 1, wherein the cylindrical rotary element is disposed in an area opposite to the image reading unit, and disposed in an area that is not opposite to the image reading unit in a direction that crosses a direction of transport of the sheet.]

3. The image forming apparatus according to claim 2, further comprising a detector that detects a test image formed on the sheet being transported, wherein the cylindrical rotary element is disposed opposite to an area in which the test image is detected by the detector.

4. The image forming apparatus according to claim 1, further comprising a detector that detects a test image formed on the sheet being transported, wherein the cylindrical rotary element is disposed opposite to an area in which the test image is detected by the detector.

5. The image forming apparatus according to claim [4] *3*, wherein the test image includes a predetermined trigger image, and the *cylindrical* rotary element has a surface color that is selected in accordance with the predetermined trigger image.

6. The image forming apparatus according to claim 1, wherein the cylindrical rotary element is removably disposed on the second guide surface.

7. The image forming apparatus according to claim 1, further comprising a cooling unit that cools the sheet, the cooling unit being disposed upstream of the image reading unit in a direction of transport of the sheet in the sheet transport path.

8. The image forming apparatus according to claim 7, wherein the cooling unit includes a heat dissipation element that contacts one side of the sheet being transported, an endless belt that circulates with the sheet sandwiched between the endless belt and the heat dissipation element to transport the sheet, and an air blower that blows air onto the heat dissipation element and the endless belt.

9. The image forming apparatus according to claim 1, further comprising a bending unit that bends the sheet, the bending unit being disposed downstream of the image reading unit in a direction of transport of the sheet in the sheet transport path.

10. The image forming apparatus according to claim 1, further comprising a bending unit that bends the sheet, the bending unit being disposed upstream of the image reading unit and downstream of a cooling unit in a direction of transport of the sheet in the sheet transport path.

11. The image forming apparatus according to claim 1, wherein the cylindrical rotary element includes a plurality of cylindrical rotating elements each separated by a gap along a rotating axis of the *cylindrical* rotary element.

12. The image forming apparatus according to claim 11, wherein the second guide surface includes a plurality of openings, each of the cylindrical rotating elements projecting through a corresponding one of the openings.

13. The image forming apparatus according to claim 11, further comprising a photosensor configured to read a pattern on the sheet, the photosensor aligned with one of the cylindrical rotating elements and the image reading unit aligned with a different one of the cylindrical rotating elements.

*14. The image forming apparatus according to claim 1, wherein the cylindrical rotary element is fixed with respect to the first guide surface to maintain the gap.*

*15. The image forming apparatus according to claim 1, wherein the second guide surface approaches the first guide surface along the sheet transport path in the transport direction.*

*16. The image forming apparatus according to claim 1, wherein the first guide surface extends along the sheet transport path.*

* * * * *